US00RE41875E

(19) United States
(12) Reissued Patent
Motegi

(10) Patent Number: US RE41,875 E
(45) **Date of Reissued Patent: *Oct. 26, 2010**

(54) COMPUTER-BASED NETWORK PRINTING SYSTEM AND METHOD FOR PROVIDING A UNIQUE IDENTIFIER TO BE INPUT BY A USER

(75) Inventor: Akihiko Motegi, Tokyo (JP)

(73) Assignee: Ricoh Company, Ltd., Tokyo (JP)

( * ) Notice: This patent is subject to a terminal disclaimer.

(21) Appl. No.: 11/582,579

(22) Filed: Oct. 18, 2006

Related U.S. Patent Documents

Reissue of:
(64) Patent No.: 6,307,640
Issued: Oct. 23, 2001
Appl. No.: 09/030,158
Filed: Feb. 25, 1998

U.S. Applications:
(

(63) Continuation of application No. 10/691,435, filed on Oct. 23, 2003, now Pat. No. Re. 39,808.

(30) Foreign Application Priority Data

Feb. 25, 1997 (JP) ..... 9-058482

(51) Int. Cl.
*G06K 15/00* (2006.01)
G06F 21/00

(52) U.S. Cl. ..... 358/1.14; 358/1.15

(58) Field of Classification Search ..... 358/1.1, 358/1.4, 1.6, 1.9, 1.13–1.15, 1.17, 401–404, 358/407, 434–439, 468; 709/203, 206, 219; 705/18

See application file for complete search history.

(56) References Cited

U.S. PATENT DOCUMENTS 4,843,571 A * 6/1989 Notermans et al. ..... 358/1.18
4,970,554 A 11/1990 Rourke ..... 399/84
5,825,988 A * 10/1998 Collard et al. ..... 258/1.13

FOREIGN PATENT DOCUMENTS

| | | |
|---|---|---|
| JP | 6-103008 | 4/1994 |
| JP | 7-152516 | 6/1995 |
| JP | 7-234830 | 9/1995 |
| JP | 07-288622 | 10/1995 |
| JP | 08-016520 | 1/1996 |
| JP | 8-107504 | 4/1996 |
| JP | 8-314653 | 11/1996 |
| JP | 9-34824 | 2/1997 |

* cited by examiner

*Primary Examiner*—Gabriel I Garcia
(74) *Attorney, Agent, or Firm*—Oblon, Spivak, McClelland, Maier & Neustadt, L.L.P.

(57) ABSTRACT

A method and computer-based printing system enable a user of a computer to send an image file to a host computer and subsequently to a printer for printing while ensuring that the user is able to retrieve the printed document without other individuals having access to the printed document. More particularly, in response to receiving a print request from a user terminal, stores the image data with a unique job number, sends the job number to the terminal computer and this terminal computer displays the job number to the user. The user may then enter the displayed job number and password on an operation unit of any printer selected by the user, and in response, the host computer downloads the stored image data associated with the inputted job number to the selected printer and the selected printer prints the document. Other individuals are prevented from viewing the printed document because only the intended recipient (i.e., the user who originated print job) knows the user's password and job number and because the intended recipient is located at the printer and can "guard" the printed document from being viewed by other people.

20 Claims, 3 Drawing Sheets

COMPUTER-BASED NETWORK PRINTING SYSTEM AND METHOD FOR PROVIDING A UNIQUE IDENTIFIER TO BE INPUT BY A USER

Matter enclosed in heavy brackets [ ] appears in the original patent but forms no part of this reissue specification; matter printed in italics indicates the additions made by reissue.

*Notice: More than one reissue application has been filed for the reissue of U.S. Pat. No. 6,307,640 B1. The reissue applications are application Ser. No. 10/691,435 (the original reissue application, now U.S. Pat. No. RE 39,808) and application Ser. No. 11/582,579 (the present application) which is a continuation reissue of U.S. Pat. No. 6,307,640 B1.*

BACKGROUND OF THE INVENTION

1. Field of the Invention

The present invention relates to a computer-based network printing method and system, which enables printing from a printer connected, directly or indirectly, in a network system to a host computer, terminal computers and other printers.

2. Description of the Related Art

Computer networks and printers that connect to the network are not new. These network print systems include a host computer, terminal computers and printers, all of which are interconnected by way of a computer communications network. The host computer manages the terminal computers that are used by respective network users. The users are able to access various printers because the printers are connected to the network and are thus, common network resources. There are various places where the printers may be located. For example, all printers may be located in the same place, different places in one building, or distributed throughout different buildings.

As recognized by the present inventor, conventional network print systems have problems. For example, a user must select one of the network printers as a prerequisite for printing. Therefore, the print output is directed to the selected printer and not another one of the available printers. Security is another problem. Conventional network printing systems have a number of users with a number of printers, where the printed output of the respective printers are available for inspection by other users. Moreover, suppose a user prints a confidential documents on a selected printer, which is connected to a network system, other user can observe, or extract, the contents of the printed document (inadvertently, or intentionally).

Japanese patent document, JLOP 4-48323 shows a print server, which has a stacker for stacking printed documents. In this print server, the stacker has a feature that allows the user to take the printed documents only when the user inputs a correct password. Thus, the only the user who has the proper password privilege can observe or extract the printed document.

However, in this conventional print server, the user can only retrieve the printed document from the selected printer, and therefore, cannot retrieve the document from another printer. Attempting to designate multiple or all printers for printing the document gives rise to a security problem.

SUMMARY OF THE INVENTION

Accordingly, an object of the present invention is to provide a novel computer-based network printing method and system which obviates the above-mentioned problems. A computer-based network print method and system according to the present invention enables a user to print documents from any printer connected to the system.

For that purpose, the present invention includes a printer having an operation unit and a host computer. The host computer receives image data to be printed send by a user by way of a terminal computer. The host computer stores the image data with a unique job number, sends the job number to the terminal computer and this terminal computer displays the job number to the user. The user may then enter the displayed job number on an operation unit of any printer selected by the user, and in response, the host computer downloads the stored image data associated with the inputted job number to the selected printer and the selected printer prints the document.

Furthermore, other users are prevented from breaching the confidentiality of the printed document because only the intended recipient (i.e., the user who originated print job) knows the user's password and job number and because the intended recipient is located at the printer and can "guard" the printed document from being viewed by other people. To this end, in this invention, a host computer or printer stores the password inputted by a user, and for printing, when the stored password and an inputted password match, documents are printed from the printer on which the user inputs the job number and password.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
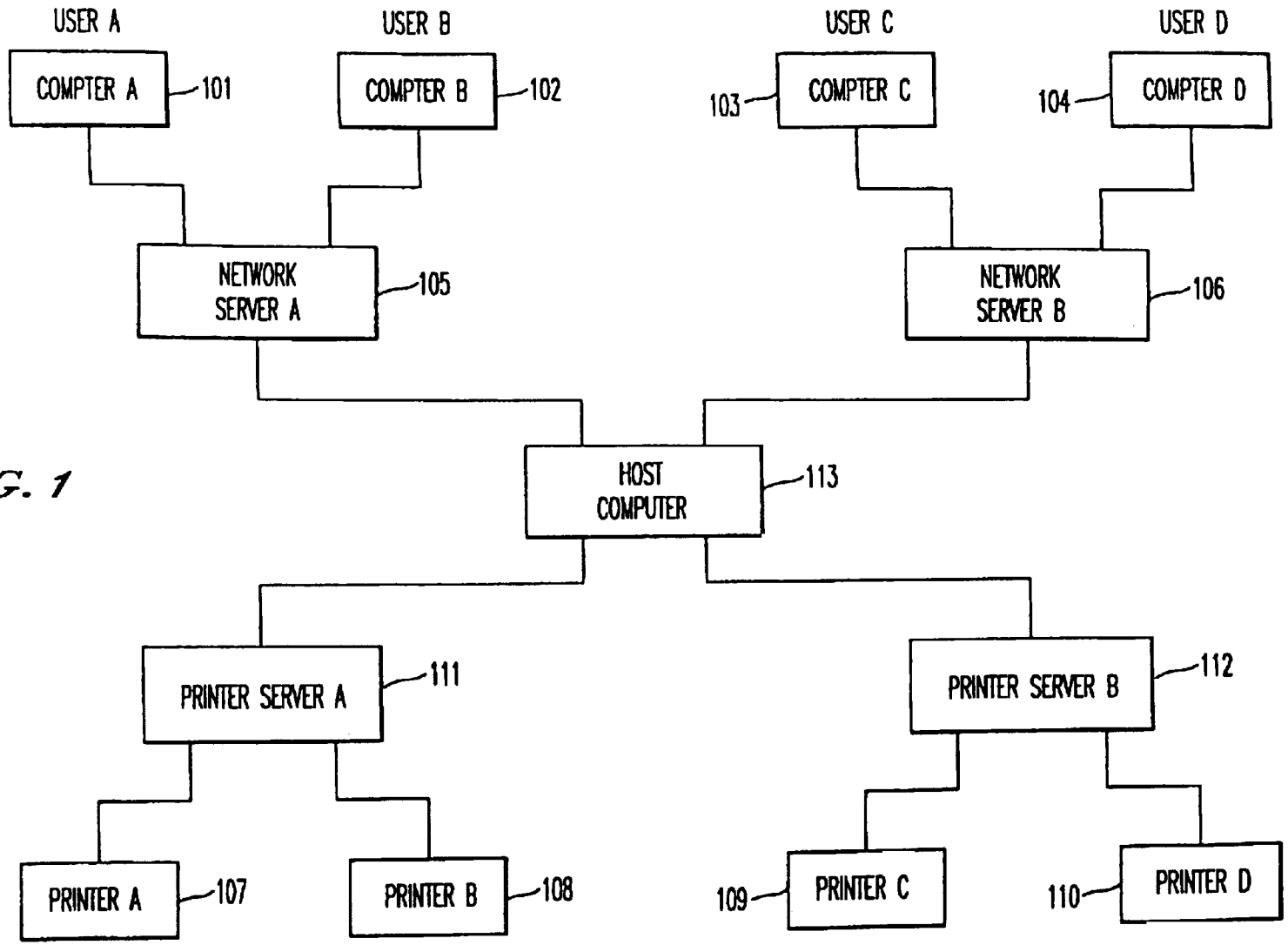
FIG. 1 is a block diagram of a network system using a network print system according to present invention.

Referring now to the drawings, wherein like reference numerals designate identical or corresponding parts throughout the several views FIG. 1 is a block diagram of a computer-based network using a computer-based network print system according to present invention. As illustrated the computer-based network system includes four computers for four users, two network servers, four printers, two print servers and one host computer. Of course other configurations are possible as well. In FIG. 1 two computers (101–102, and 103–104) are connected to each network servers 105 and 106. In turn, the two network servers 105 and 106 are connected to a host computer 113, which controls the entire network. The network servers 105 and 106 and the host computer 113 communicate with each other by a bus.

Also shown in FIG. 1 are two printer pairs (107–108, and 109–110) respectively connected to print servers 111 and 112. The two print servers 111 and 112 are connected to the host computer 113. The print servers 111 and 112 control printing according to authorization commands from the host computer 113, and the printers 107, 108, 109 and 110 work according under the control of the printer servers 111 and 112.

In this network system, four users (Users A–D, as identified in FIG. 1) send print information, in the form of image data, text data and so on, to the host computer 113 by way of the network servers 105 and 106. Furthermore, each of the four users have complete control over which of the four printers 107, 108, 109 and 110, the user would like to effect the print operation. Control over selecting the printer is carried out by the user, who, by entering on a keypad of the desired printer, the user's password and print job number. Alternatively, the user may simply enter the job number, if no passwords are required.

Figure 2:
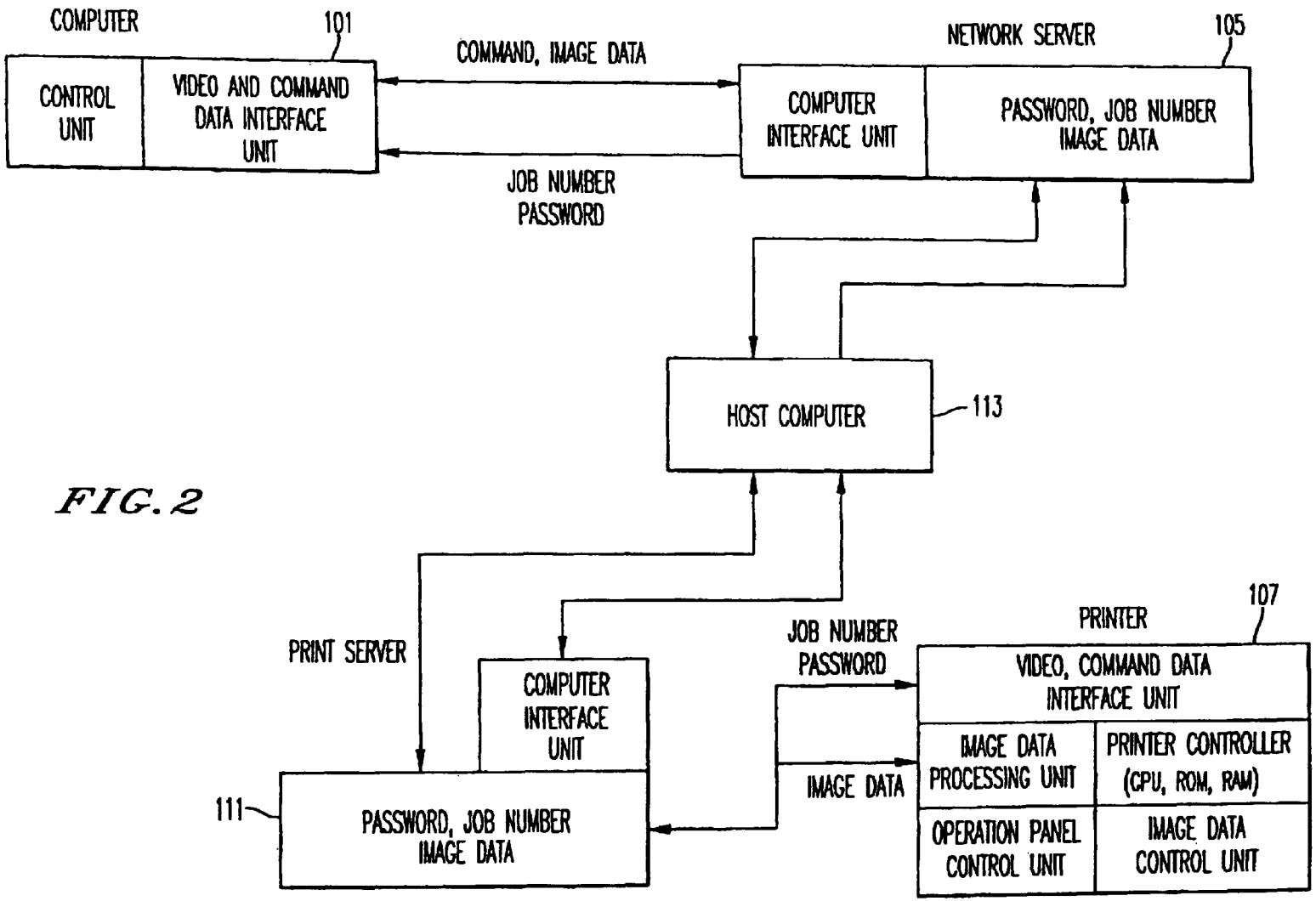
FIG. 2 is a diagram of each block in FIG. 1 and an interface between each block.

FIG. 2 is a diagram of each block in FIG. 1 and an interface between each block. The host computer 113 has a video and command data interface unit (not shown) that connects to the network server 105 and the print server 111. The network server 105 has a computer interface unit for connecting to the computer 101. The printer 107 has a video and command data interface for connecting to the print server 111, an image data processing unit for processing image data, a printer controller which has a CPU for controlling the printer apparatus, a ROM for storing a controlling program and a RAM for storing controlling data, an operation panel control unit for controlling an operational panel, on which the user may enter data and view displayed information.

The print server 111 receives data for example, a user password, a job number and an image data, from the host computer 113, and receives a job number and password inputted by user from the operation panel.

In this network system, data for printing is sent from the computer 101 to the network server 105, which processes the data and sends the processed data to the host computer 113. The host computer 113 matches a job number with the password (assigned to the user or established by the host computer) and the image data to be printed, as supplied from the computer 101 by way of the network server 105. The user is then free to go to any printer on the network and have the document printed therefrom. To this end, the user walks to a printer (e.g., printer 107) and inputs the job number and password on the printer's operation panel. Alternatively, the user need not be physically present, but send control commands to the selected printer 107, identifying the password and job number, as if the user had entered this information on the printer's keypad. The selected printer 107 then requests the password and job number be verified by the host computer 113, by passing the password and job number provided by the user through the print server 111 to the host computer 113.

Figure 3:
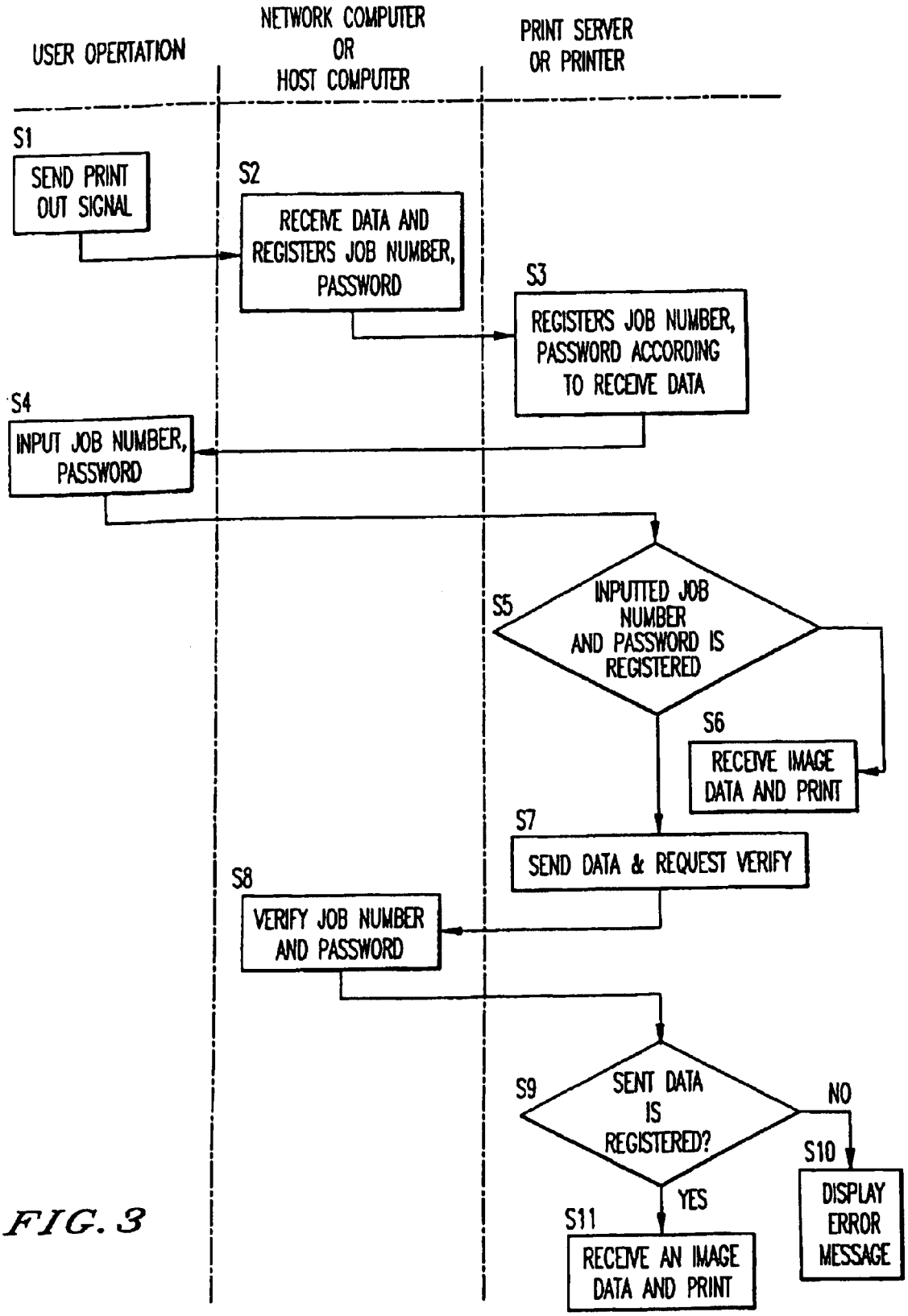
FIG. 3 is a flowchart of an operation of this network system including user operations for the computer and the printer.

FIG. 3 is a flowchart of an operation of the present computer-based network system and includes user operations performed by the user on the computer terminal, operations performed by the network computer or host computer, and operations performed by the printer server or printer. The process begins in step S1 where a user employs the computer terminal to dispatch a print request message, with image data, to the network server. Next, in step S2 the network server receives the print request signal, with image data, and sends a related message to the host computer. The host computer then registers the job number and password with the image data sent from the network computer. As part of step S2, the host computer sends the job number, password and the image data to the print server and also sends the job number and password to the computer display so the user can view the job number and password assigned by the host computer to the print job. Alternatively, the host computer only sends the job number, and the user merely uses a personal password, or no password at all.

The process then proceeds to step S3 where the print server registers the job number and password according to the information sent from the host computer. Alternatively, the job number and password are retained by the host computer and the print server remains passive and awaits the user to enter a job number and password on the printer's keypad, whereby the print server will relay the entered job number and password to the host computer.

When the user actually makes the print request, the user inputs the job number and password on the keypad of any selected printer (step S4). The selected printer then sends this information to the print server, which in step S5 verifies that the inputted job number and password match that provided by the host computer. Alternatively, the host computer performs the verification. If the response to the inquiry in step S5 is affirmative, the process proceeds to step S6, where the selected printer prints the image data, and the process ends. However, if the response to the inquiry in step S5 is not affirmative, the process proceeds to step S7 where the print server sends the inputted job number and password to the host computer, which performs a secondary verification in step S8 and sends a result message to the printer server. In step S9 the print server interprets the result message from the host computer, and determines conclusively whether the job number and password from entered by the user are the same as those originally assigned by the host computer. If the result of the inquiry in step S9 is negative, the printer displays an error message and the process ends. However, if the response to the inquiry in step S9 is positive, the process proceeds to step S11 where the image data is downloaded to the printer and the printer prints the document.

In the above-described computer-based network system, a user who sends a print signal is able to have the desired document from any printer connected to the network. Furthermore, the user may have the document printed with a reasonably high degree of certainty that the confidentiality of the document will not be compromised because only users who know the password and job number are able to activate the printing of the document at the selected printer.

This invention may be conveniently implemented using a conventional general purpose digital computer or microprocessor programmed according to the teachings of the present specification, as will be apparent to those skilled in the computer art. Appropriate software coding can readily be prepared by skilled programmers based on the teachings of the present disclosure, as will be apparent to those skilled in the software art. The invention may also be implemented by the preparation of application specific integrated circuit or by interconnecting an appropriate network of conventional components, as will be readily apparent to those skilled in the art.

This application is based on Japanese patent application 9-058482 filed in the Japanese Patent Office on Feb. 25, 1997, the entire contents of which are hereby incorporated by reference.

What is claimed as new and is desired to be secured by Letters Patent of the United States is:

[1. A network print system comprising:

a computer terminal having, a processor, a computer user interface, and a computer display, said processor being configured to produce a print request message in response to information provided through said computer user interface, said print request message containing image data, and said print request message not uniquely identifying a device for printing said image data;

a plurality of printers communicatively coupled to said computer terminal, said plurality of printers each having a printer user interface with a data input device and a data display device; and a host computer communicatively coupled to said plurality of printers and said computer terminal and configured to receive said print request message, said host computer having a memory in which said image data is stored, and a host computer processor configured to produce a job number associated with said print request message and send said job number to said computer terminal, wherein said computer terminal being configured to display on said computer display an indication of said job number provided by said host computer, said host computer processor being configured to recognize when said job number is input to a particular printer of said plurality of printers via said printer user interface and configured to, based on said job number input, associate said particular printer with said print request message and identify the particular printer as the printer for receiving the print request message, and provide said image data to said identified particular printer for printing so that a user can input said job number into any one of the plurality of printers in order to print the image data at the printer into which the user input the job number.]

[2. A network print system comprising:

a computer terminal having, a processor, a computer user interface configured to receive a password entered by a user, and a computer display, said processor being configured to produce a print request message containing image data and said password, said print request message not uniquely identifying a device for printing said image data;

a plurality of printers communicatively coupled to said computer terminal, said plurality of printers each having a printer user interface with a data input device and a data display device; and a host computer communicatively coupled to said plurality of printers and said computer terminal, and configured to receive said print request message, said host computer having a memory in which said image data and said password are stored, and a host computer processor configured to produce a job number associated with said print request message, store said job number in said memory in association with said image data and said password, and send said job number to said computer terminal, wherein said computer terminal being configured to display on said computer display an indication of said job number provided by said host computer, and said host computer processor being configured to recognize when said job number and said password are input to a particular printer of said plurality of printers via said printer user interface and configured to, based on said job number input, associate said particular printer with said print request message and identify the particular printer as the printer for receiving the print request message and provide said image data to said identified particular printer for printing so that the user can input said job number and said password into any one of the plurality of printers in order to print the image data at the printer into which the user input the job number and said password.]

[3. A network print system comprising:

a computer terminal having, a processor, a computer user interface, and a computer display, said processor being configured to produce a print request message containing image data, said print request message not uniquely identifying a device for printing said image data;

a plurality of printers coupled to said computer terminal, each printer having a printer user interface with a data input device and a data display device, and a printer memory configured to hold a user password, a host computer coupled to said plurality of printers and said computer terminal, and configured to receive said print request message, said host computer having a host computer memory in which said image data is stored, and a host computer processor configured to produce a job number associated with said print request message, store said job number in said host computer memory in association with said image data, and send said job number to said computer terminal, wherein said computer terminal being configured to display on said computer display an indication of said job number provided by said host computer, at least one of said host computer and said plurality of printers being configured to determine if an input data input through said printer user interface of a particular printer of said plurality of printers matches said job number, and if so, to associate said particular printer with said print request message, identify the particular printer as the printer for receiving the print request message and provide said image data to said particular printer, each of said plurality of printers being configured to determine whether a password input via said printer user interface matches said password stored in said printer memory and if so printing a document corresponding to said image data so that a user can input said input data and a password into any one of the plurality of printers in order to print the image data at the printer into which the user input the input data and the password.]

[4. A secure method for printing a document in a network print system having a plurality of printers, comprising the steps of:

receiving an image data at a first network terminal;

producing a print request message at said first network terminal and sending said print request message and said image data to a second network terminal, said print request message not uniquely identifying a device for printing said image data;

storing in memory said image data and an associated job number at said second network terminal;

sending a reply message to said first network terminal from said second network terminal, said reply message including said associated job number;

displaying said associated job number at said first network terminal;

receiving a local print request message at said second network terminal from a particular printer of said plurality of printers, said local request message having an input job number; and comparing said input job number with said associated job number and if said input job number matches said associated job number, associating said particular printer with said print request message and identifying the particular printer as the printer for receiving the print request message, and printing from said identified particular printer a document corresponding to said image data so that a user can input said input job number into any one of the plurality of printers in order to print the image data at the printer into which the user input the input job number.]

[5. The method of claim 4, wherein:

the storing step includes storing said image data and said associated job number at a host computer, said second network terminal comprising said host computer and at least one printer, said at least one printer having a printer user interface;

the step of receiving the local print request message at the second network terminal includes inputting the input job number on the printer user interface of any one of said at least one printer; and the comparing step includes comparing at the host computer the input job number with the associated job number.]

[6. The method of claim 4, wherein:

said receiving an image data step includes receiving a password;

the producing a print request message step includes sending the password;

the storing step includes storing said password;

the step of receiving a local print request message includes receiving an input password; and the comparing step includes comparing the password with the input password and printing the image data if said input password matches said password.]

[7. The method of claim 4, further comprising:

storing an assigned password at the second network terminal;

inputting a local password at any one of said plurality of printers; and comparing the local password with the assigned password, wherein said step of printing from said any one of said plurality of printers comprises printing said document only if said local password matches said assigned password.]

[8. A secure network print system having a plurality of printers, comprising:

means for receiving an image data at a first network terminal;

means for producing a print request message not uniquely identifying a device for printing said image data at said first network terminal and for sending said print request message and said image data to a second network terminal;

means for storing in memory said image data and an associated job number at said second network terminal;

means for sending a reply message to said first network terminal from said second network terminal, said reply message including said associated job number;

means for displaying said associated job number at said first network terminal;

means for inputting a local print request message at a particular printer of said plurality of printers, said local print request message having an input job number;

means for sending said local print request message to said second network terminal; and means for comparing said input job number with said associated job number and if said input job number matches said associated job number associating said particular printer with said print request message and identifying the particular printer as the printer for receiving the print request message, and printing from said identified particular printer a document corresponding to said image data so that a user can input said input job number into any one of the plurality of printers in order to print the image data at the printer into which the user input the input job number.]

*9. A network host computer, comprising:*

*an interface unit configured to communicatively couple the network host computer to a computer terminal and a plurality of printers, said interface unit being configured to receive print data from said computer terminal, said print data not uniquely identifying a printer for printing the print data;*

*a memory configured to store said print data; and*

*a processor configured to:*

*produce a job number associated with the print data received from the computer terminal,*

*recognize that said job number has been input to a user interface associated with a particular printer of said plurality of printers, and*

*associate said user interface with said print data and identify the user interface as the user interface for receiving the print data, and*

*provide said print data to said identified user interface for printing, wherein a user can input said job number into any one of a plurality of user interfaces in order to print the print data at the printer associated with the user interface into which the user input the job number.*

*10. The network host computer of claim 9, wherein said processor is further configured to send said job number to the computer terminal so that the job number can be displayed on the computer terminal.*

*11. The network host computer of claim 9, wherein*

*said memory is configured to store said job number, and*

*said processor is configured to associate said user interface with said print data and identify the user interface as the user interface for receiving the print data by verifying that the job number input to the user interface associated with said particular printer matches said job number stored in said memory.*

*12. The network host computer of claim 11, wherein said processor is further configured to perform a secondary verification if said job number input to the user interface associated with said particular printer does not match said job number stored in said memory.*

*13. The network host computer of claim 9, wherein said processor is further configured to send an error message to said user interface when a job number input to said user interface associated with the particular printer does not match said job number stored in said memory.*

*14. The network host computer of claim 9, wherein said interface unit is further configured to receive a password from said computer terminal.*

*15. The network host computer of claim 14, wherein said processor is further configured to send said job number and password to the computer terminal so that the job number and password can be displayed on the computer terminal.*

*16. The network host computer of claim 14, wherein said processor is further configured to:*

*associate said job number with said password and print data received from the computer terminal;*

*recognize that said job number and password have been input to said user interface associated with said particular printer of said plurality of printers;*

*associate said user interface with said print data and identify the user interface as the user interface for receiving the print data; and*

*provide said print data to said identified user interface for printing, wherein a user can input said job number and password into any one of a plurality of user interfaces in order to print the print data at the printer associated with the user interface into which the user input the job number.*

*17. The network host computer of claim 14, wherein*

*said memory is configured to store said job number and password, and*

*said processor is configured to associate said user interface with said print data and identify the user interface as the user interface for receiving the print data by verifying that the job number and password input to the user interface associated with said particular printer matches said job number and password stored in said memory.*

*18. The network host computer of claim 17, wherein said processor is further configured to perform a secondary verification if said job number and password input to the user interface associated with said particular printer does not match said job number and password stored in said memory.*

*19. The network host computer of claim 16, wherein said processor is further configured to send an error message to said printer when a job number and password input to the user interface associated with said particular printer does not match said job number and password stored in said memory.*

*20. A network print system comprising:*

*a user computer terminal configured to provide network access for a user;*

*a plurality of printers each associated with a user interface on which the user may enter data and view displayed information; and*

*a network host computer comprising:*

*an interface unit configured to communicatively couple the network host computer to said user computer terminal and said plurality of printers, said interface unit being configured to receive print data from said computer terminal, said print data not uniquely identifying a printer for printing the print data,*

*a memory configured to store said print data, and*

*a processor configured to:*

*produce a job number associated with the print data received from the computer terminal,*

*recognize that said job number has been input to the user interface associated with a particular printer of said plurality of printers,*

*associate said user interface with said print data and identify the user interface as the user interface for receiving the print data, and*

*provide said print data to said identified user interface for printing,*

*wherein a user can input said job number into any one of a plurality of user interfaces in order to print the print data at the printer associated with the user interface into which the user input the job number.*

*21. The network print system of claim 20, wherein said network host computer is configured to produce at least one of a letter and a number as said job number.*

*22. A method of printing on any one of a plurality of printers on a network, the method comprising:*

*receiving print data from a computer terminal, the print data not uniquely identifying a printer for printing the print data;*

*producing a job number associated with the print data;*

*recognizing that said job number has been input to a user interface associated with a particular printer of said plurality of printers,*

*associating said user interface with said print data and identifying the user interface as the user interface for receiving the print data, and*

*providing said print data to said identified user interface for printing, wherein a user can input said job number into any one of a plurality of user interfaces in order to print the print data at the printer associated with the user interface into which the user input the job number.*

*23. The method of claim 22, wherein said producing a job number comprises producing an identifier comprising at least one of a number and a letter.*

*24. The method of claim 22, wherein said recognizing comprises receiving said job number from a printer interface unit associated with said particular printer of said plurality of printers.*

*25. The method of claim 22, wherein said recognizing comprises receiving said job number from a printer controller associated with said particular printer of said plurality of printers.*

*26. A printer user interface comprising:*

*a data input device,*

*a data display device,*

*an interface unit configured to communicatively couple a printer to a computer terminal, a host computer and a plurality of other printers; and*

*a processor configured to:*

*receive a job number input through said input device, the job number previously associated with print data by the host computer, the print data being sent by the computer terminal and not uniquely identifying a printer for printing said print data, and*

*send said job number to said host computer, which identifies the user interface that sent the job number as the user interface to receive the print data and provides the print data to the identified user interface, wherein a user can input said job number into any one of a plurality of user interfaces, in order to print the print data at the printer associated with the user interface into which the user input the job number.*

*27. The printer user interface of claim 26, wherein said processor is configured to receive at least one of a letter and a number as said job number.*

*28. The printer user interface of claim 26, wherein said processor is further configured to:*

*receive a password and said job number input through said input device, the password and job number previously associated with said print data by the host computer; and*

*send said password and job number to said host computer, which identifies the user interface that sent the password and job number as the user interface to receive the print data and provides the print data to the identified user interface, wherein a user can input said password and job number into any one of a plurality of user interfaces in order to print the print data at the printer*

*associated with the user interface into which the user input the password and job number.*

* * * * *